Figure 1:
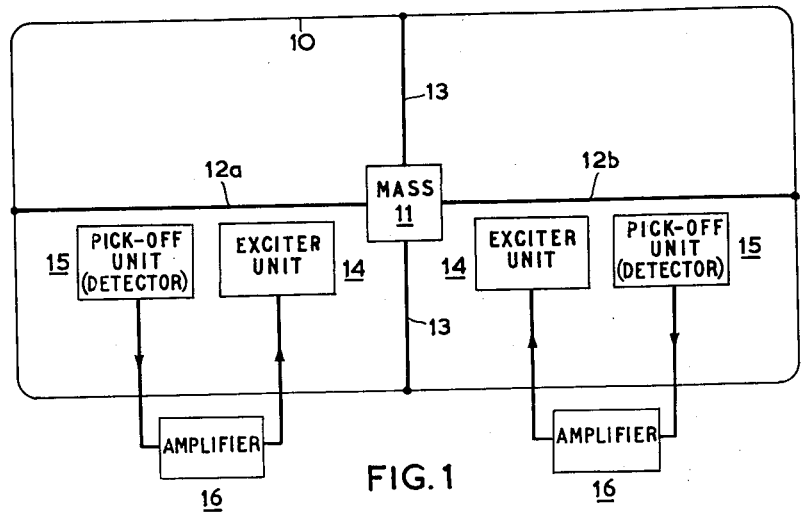

Oct. 9, 1962   L. H. BEDFORD   3,057,208
ACCELEROMETERS
Filed Sept. 26, 1957   2 Sheets-Sheet 1

Oct. 9, 1962 L. H. BEDFORD 3,057,208
ACCELEROMETERS
Filed Sept. 26, 1957 2 Sheets-Sheet 2
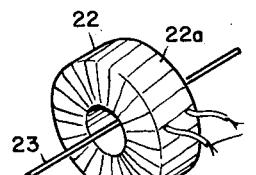
FIG.3
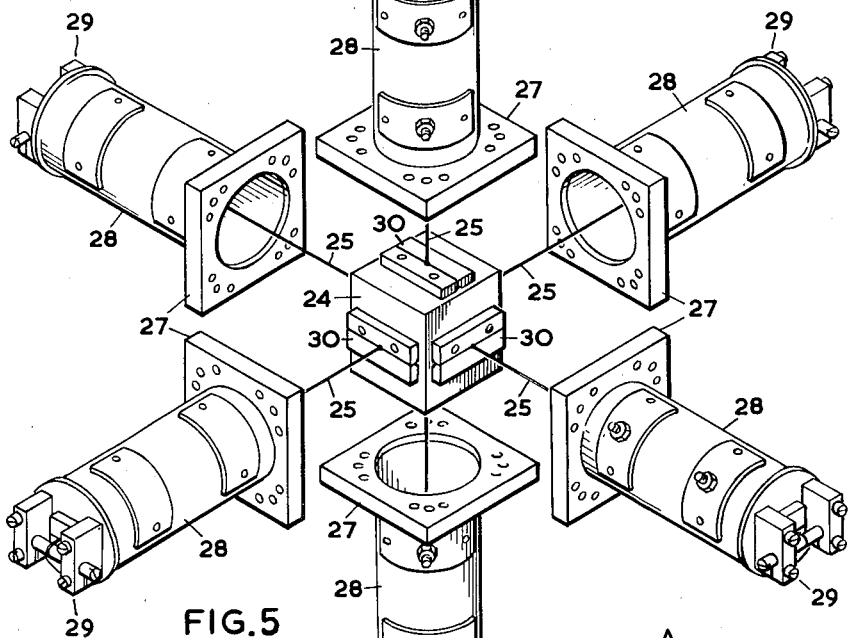
FIG.5
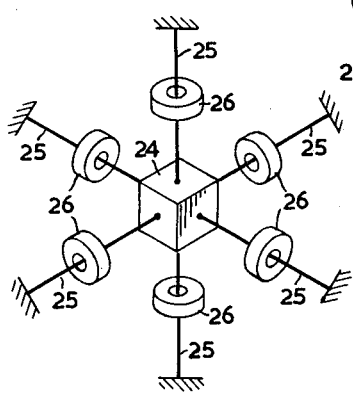
FIG.4
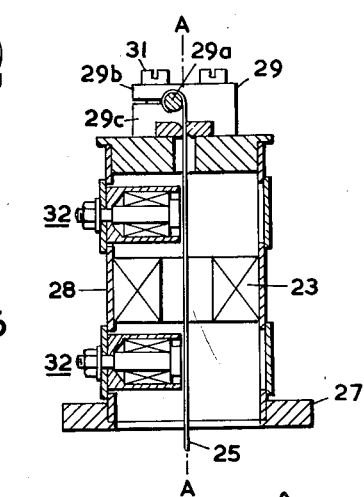
Inventor:
Leslie Herbert Bedford
By: Stevens, Davis, Miller+Mosher
Attorneys United States Patent Office 3,057,208
Patented Oct. 9, 1962

3,057,208
ACCELEROMETERS
Leslie Herbert Bedford, London, England, assignor to The English Electric Company Limited, London, England, a British company
Filed Sept. 26, 1957, Ser. No. 686,538
Claims priority, application Great Britain Oct. 3, 1956
7 Claims. (Cl. 73—517)

This invention relates to accelerometers in which the natural frequency of a tensioned string is applied to afford a measure of the acceleration to which a mass is subjected.

In such an accelerometer a mass is usually supported by two pre-tensioned wires which are caused to vibrate at their natural frequencies. When the mass is accelerated along a direction in line with the wires, the tension in one wire increases and there is a corresponding decrease in the tension of the other wire. As a result, the natural frequencies of vibration of the two wires change in opposite senses and a sensitive measure of the acceleration is afforded by the change in the difference frequency.

In a simple form of the device a mass is supported between two identical strings (the word "strings" is used as a generic term including wires since, as will be readily appreciated from a comparison with musical instruments, non-metallic materials may be used to replace the wire). For zero acceleration in the string direction (the acceleration of gravity being included by the term "acceleration"), the two strings have identical modes of vibration, if they are caused to vibrate at corresponding natural frequencies there will be no difference between their frequencies. However, when the device is subject to acceleration along the string direction the strings vibrate at different frequencies and the difference frequency is related to the acceleration in a direct but non-linear manner. It can be shown that the relationship between the difference frequency and the acceleration becomes a linear one provided the pre-tension of the strings is controlled so that the sum of the two frequencies of vibration is a constant.

This affords a convenient means by which the accelerometer characteristic can be rendered linear.

When an attempt is made to apply these simple principles in an accelerometer various difficulties may be encountered. For example, since the mass cannot be infinitely large compared with the mass of the strings, there is a finite coupling between the two strings, which may lead to mutual "pulling" of the two frequencies at small frequency difference, and hence a "dead sector" at very low acceleration or a disturbance of the desired linear characteristic. This effect may be eliminated by designing the accelerometer so that equal frequencies do not occur over the working range of the instrument.

According to the invention, an accelerometer of the kind set forth comprises an assembly formed by a frame structure, a suspended body, and two strings which hold one another in tension by supporting the body from the frame structure, exciter means operative to maintain the strings in vibration at unequal frequencies, detector means responsive to the vibration of the strings and operative to produce electrical signals which are a measure of the string frequencies, computer means responsive to these signals and operative to compare these frequencies of vibration in a manner determined by the zero acceleration inequality of the frequencies and operative to provide output information which is substantially linearly related to the acceleration to which the accelerometer is subject.

The computation problem is much simplified if the string tension is suitably controlled as the acceleration to which the accelerometer is subject changes. It is, therefore, in accordance with a feature of the invention for the accelerometer to comprise means for controlling the string tension in accordance with the vibration frequencies of the strings, which means are controlled in a manner calculated to facilitate the computation performed by said computer means.

As is explained subsequently, the interpretation of data for such an instrument is greatly aided if the string frequency ratio is a "rational number," i.e. the quotient of two integers.

It is, therefore, in accordance with another feature of this invention for the strings in an accelerometer of the kind set forth to have unequal natural frequencies of vibration related by a simple integral or fractional multiple or sub-multiple. It is to be noted that the scope of the invention does not exclude accelerometers in which identical strings are excited to vibrate at different harmonic frequencies. The invention in one of its forms provides an accelerometer wherein said exciter means excite different modes of vibration in the strings.

A particular advantage afforded by this choice of a simple relationship between the natural frequencies of vibration of the strings arises from the fact that multiplication of frequency can be carried out electrically most easily when the multiplying factor is integral. Further features of the invention relate to the particular form of accelerometer systems in which the natural frequencies of the accelerometer strings are related by a simple ratio. However, yet another feature of the invention is concerned with an accelerometer system in which the natural string frequencies are almost but not quite related by such a simple ratio, the slight difference being applied to compensate a second order term which would otherwise introduce a slight non-linearity in the accelerometer characteristics.

Yet another feature of the invention is concerned with a three-dimensional form of accelerometer of the kind set forth in which a single body provides the acceleration-responsive mass for three pairs of strings which have directions mutually at right angles, string excitation at unequal natural frequencies of vibration being obtained by the use of strings which have different masses per unit length rather than unequal lengths.

Figure 2:
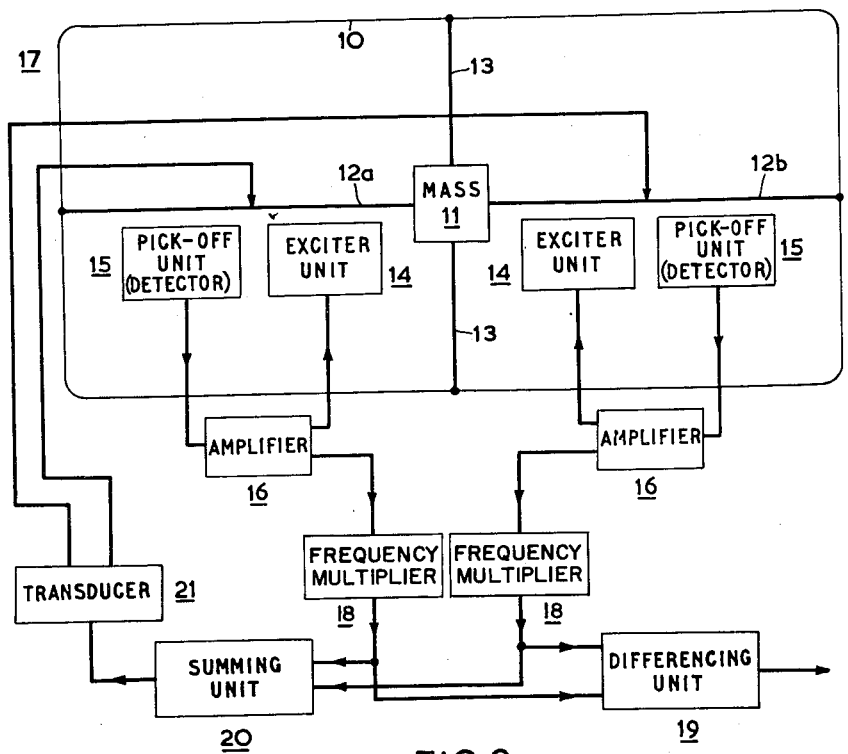

The invention will now be described with reference to the accompanying drawings, in which:

FIG. 1 illustrates an accelerometer of the kind set forth,

FIG. 2 illustrates an accelerometer system embodying the invention in preferred form, FIG. 3 illustrates diagrammatically an inductive device by which an electrical signal may be applied to introduce heat into an accelerometer string, FIG. 4 illustrates a three-dimensional form of accelerometer system, FIG. 5 shows the constructional details of a three-dimensional form of accelerometer system, and FIG. 6 shows an enlarged sectional view of one of the six exciter units shown in FIG. 5.

In FIG. 1 a schematic representation of an accelerometer of the kind set forth is shown.

A rigid housing 10 contains a mass 11 which is supported from the walls of the housing by two wires 12a, 12b, and four ligaments 13 arranged around the mass in quadrature (only two are shown). The wires are pre-tensioned, as also may be the ligaments. Adjacent to each wire is an exciter unit 14 and a pick-off unit 15 which serve respectively to promote transverse vibration in the wire and to provide information relating to the frequency at which the wire is vibrating. Amplifier units 16 connected between each of the units 14 and 15 are adapted to promote the vibration of the wires at their natural frequencies. These amplifiers also provide output signals which may be applied by means not shown in the drawing to measure any change in the difference between these natural frequencies.

It may be shown by analysis that, subject to the conditions that the wires 12a and 12b are identical and that the wires remain taut, the fundamental frequencies $f_1$ and $f_2$ at which the respective wires vibrate are related to the acceleration $a$ in the direction of the wires by the relationship:

$$a \propto (f_1 - f_2)(f_1 + f_2) \qquad (1)$$

This relationship shows that if the accelerometer is continuously conditioned so that $f_1 + f_2$ is maintained constant the difference frequency obtained by comparing the frequencies $f_1$ and $f_2$ bears a directly proportional linear relationship to the acceleration $a$.

When, in accordance with this invention, the accelerometer is designed so that the wires 12a and 12b have different frequencies of vibration a relationship of the form:

$$a \propto (L_{10}f_1/L - L_{20}f_2/L)(L_{10}f_1/L + L_{20}f_2/L) \qquad (2)$$

applies. In this relationship $L_{10}$ and $L_{20}$ are the respective undisturbed lengths of the accelerometer wires 12a and 12b respectively, and $L$ is an arbitrary constant having the dimension of length. It is to be noted that $L$ has only been introduced in order that the terms $L_{10}f_1/L$ and $L_{20}f_2/L$ may be regarded as frequency terms.

To obtain a linear relationship between acceleration and an output signal calls for a multiplication of the frequencies $f_1$ and $f_2$ before they can be applied to condition the accelerometer to maintain, say $L_{10}f_1/L + L_{20}f_2/L$ constant. In a preferred embodiment of the invention $L_{10}$ and $L_{20}$ are chosen so that $L_{10}/L$ and $L_{20}/L$ are integral, thus allowing standard frequency multiplication techniques to be applied. A convenient choice of these integers is, for example, 15 and 16 respectively.

In FIG. 2 a block schematic diagram shows the necessary circuit arrangement for use with such an accelerometer.

The accelerometer shown generaly at 17 has the same form as that shown in FIG. 1, and the reference numerals 10–16 correspond to those in that FIGURE. In the case under consideration, however, the accelerometer 17 is so designed that the values of $L_{10}$ and $L_{20}$ are unequal but are related to the ratio 15:16. This means that the two systems each comprising an exciter unit 14, a pick-off unit 15, and an amplifier unit 16 are designed and/or the lengths of the wires 12a and 12b are chosen so as to cause the wires to vibrate at different natural frequencies.

Electrical signals having frequencies equal to those of vibration of the wires are available from the corresponding amplifier units 16. These signals are supplied to respective multiplication units 18, which serve to increase the signal frequencies by factors which are inversely proportional to the respective initial undisturbed frequency of vibration of the wires. Thus, since in the undisturbed condition wire 12a vibrates at $$\frac{15}{16}$$

of the rate of vibration of the wire 12b, the multiplication unit 18 responsive to the condition of the wire 12a may operate to multiply the input signal by a factor 16 whereas the unit 18 responsive to the condition of the wire 12b would be designed to multiply the frequency of its input signal by the factor 15. With such an arrangement, in the absence of disturbing influences caused by gravitational or acceleration forces, both multiplication units should supply signals having identical frequencies.

When the accelerometer is subjected to acceleration in the direction of the wires the frequencies of vibration of the wires change in opposite senses with the result that there is a difference between the frequencies of the output signals supplied by the units 18. As has already been explained this difference frequency can be caused to be directly proportional to the acceleration provided the sum of the frequencies of the two output signals from the units 18 is maintained constant. Thus, in FIG. 2, there is a differencing unit 19, which is responsive to the two output signals supplied by the units 18. This differencing unit supplies an output quantity which is a measure of the difference frequency. Also, a unit 20, responsive to the frequency of the signals supplied by the units 18, provides an output signal which is a measure of the sum of the two input frequencies, which signal is then applied by transducer means 21 to condition the accelerometer in such a way that the output from unit 20 is constant.

The accelerometer may be so controlled by adjusting the tension in the wires 12a and 12b. Various forms of electromechanical transducer element may be used for this purpose but a preferred method is that described in the co-pending patent application of Leslie Herbert Bedford for Accelerometers, Serial No. 686,537, filed September 26, 1957. Such a method will be described with reference to FIGS. 3 and 4. By this method the wires have an initial tension which is normally reduced by introducing heat which expands the wires. A control of the tension is then obtained by increasing or decreasing the rate at which heat is applied.

Whereas the accelerometer systems already described are designed to produce output signals which are proportionally related to acceleration, it is to be noted that this proportionality is subject to the limiting conditions imposed upon the mathematical derivation of expressions such as (1) and (2) and also upon the degree of accuracy of the frequency multiplications or divisions and particularly upon the adjustment of the wire lengths. In practice, accurate frequency multiplication and division is readily achieved. Also, the adjustment of the wire lengths presents no difficulty if the adjustment is made as a calibration step involving, for example, a matching of zero output signal with a state of zero acceleration. This causes the provisos governing the Expressions 1 and 2 to become the most critical factors.

Exact analysis shows that the most serious error factor in an exact expression corresponding to (1) or (2) above is a parabolic term, i.e. a term involving $a^2$. A feature of this invention concerns a modification of the accelerometer system by which this parabolic term is compensated by a corresponding expression arising from what might be called a maladjustment of the wire lengths. The system is calibrated by adjusting the wire lengths in such a way that the parabolic term in the system characteristic is eliminated. Such an adjustment is not consistent with the requirement for zero output signal at zero acceleration, but this requirement is by no means necessary and may even be undesirable if the accelerometer is required to measure deceleration as well as acceleration in a given direction.

It is possible to obtain a controlled linear relationship between accelerometer output signal and acceleration and have zero output for zero acceleration if the accelerometer is conditioned in a particular way. This may be done by developing analytically the exact relationship between the acceleration $a$ and the appropriate parameters and controlling the tension of the accelerometer wires so as to maintain some complex function of the frequencies of vibration of the wires constant. The second order of corrections involved could quite adequately be made by analogue techniques whilst the main control could be exercised in accordance with digital as opposed to analogue data.

It will be apparent from the foregoing description that the basic principle of eliminating the pulling effect between wires in an accelerometer of the kind under consideration by designing the accelerometer system so that the wires vibrate at different actual frequencies can be applied in a variety of ways. In order to design an accelerometer system which utilizes this principle it is convenient if the wires vibrate at natural frequencies which are related in some rational way since this enables accurate frequency multiplication and division techniques to be utilized in computing the output signal and the control signal which may be applied to condition the accelerometer for linear response. The system shown in FIG. 2 is typical of designs which may embody the invention.

The accelerometers described function to measure acceleration in a direction lying along the tension wires. In order to measure acceleration in a three-dimensional system three such accelerometers may be used, their operational directions being mutually at right angles. Alternatively, the accelerometers shown in the figures may be modified by replacing the ligaments 13 by tension wires similar to 12a and 12b. Each pair of these wires would then have all the necessary equipment for excitation and detection of vibration and the computing equipment necessary for providing the output signals and control signals for conditioning the accelerometer. The construction and operation of the three-dimensional form of instrument will be apparent from the foregoing description of a one-dimensional accelerometer system owing to the analogy between the two, but as the illustrations in FIG. 1 and FIG. 2 are only schematic the constructional form of a three-dimensional instrument will be shown in detail with reference to FIGS. 5 and 6. By a converse analogy a constructional form of a one-dimensional accelerometer will be evident from FIGS. 5 and 6.

The standing zero-acceleration tension in the wires supporting the acceleration-responsive mass can be controlled by introducing heat into the wires at a controlled rate. In this way the unstrained lengths of the wires are changed and, if required, the frequencies $f_1$ and $f_2$ can be controlled to assure the condition that the expression $L_{10}f_1/L + L_{20}f_2/L$ is maintained constant. In a preferred form of accelerometer heat is introduced directly into the wires. Thus, by generating the heat in the wires themselves the fast-cooling properties of the wires can be utilised and an accelerometer having a rapid rate of response to this thermal control can, therefore, be obtained. Heat may be generated in a wire by passing an electrical current through it and since the prime purpose of the current is the generation of heat, the larger this current the better. Accordingly it is highly desirable for the accelerometer wire to form part of a single turn secondary winding of a transformer. Apart from this, the problems which would be involved if an attempt were made to pass an electric current through the accelerometer wires by applying a P.D. across them are obviated.

In FIG. 3 an inductive device suitable for introducing heat into an accelerometer wire is shown. It comprises simply a circular magnetic core 22 which embraces the accelerometer wire 23 and has a toroidal primary winding 22a provided with leads 22b. For optimum sensitivity it is desirable to have as uniform a heating and cooling of the accelerometer wires as possible, and it is therefore desirable to have one or more of the devices shown in FIG. 3 on each of the wires in an accelerometer.

It becomes essential to use the same number of these devices per wire when the accelerometer system has the three-dimensional form shown in FIG. 4. Here, a mass 24 is supported by three pairs of wires, each pair having a common direction which is mutually at right angles to those of the other pairs. The accelerometer includes six identical inductive devices 26 which are mounted one on each of the wires 25. Identical signals, representing the thermal control signal appropriate to a particular acceleration direction are supplied to the appropriate pair of devices 26. This ensures that whatever current flows in one wire of a pair the same current will flow through the other wire of the pair and there is therefore no interference between the heating currents in the various directions.

The apparatus required for exciting and detecting the vibration of the wires and producing control signals for the device 26 is not represented in FIG. 4, but it would take the same general form as that indicated in FIG. 2, there being three distinct control systems and, of course, three output signals.

In a practical embodiment of the three-dimensional form of accelerometer shown in FIG. 4 it is desirable, though not essential, to arrange for a cooling of the wires that is substantially independent of the temperatures of the other wires. For this purpose the wires should be screened. Preferably they should be mounted within cylindrical metal containers and arranged along the longitudinal axes of these containers.

The detailed constructional features of a three dimensional form of accelerometer of the kind just described are shown in FIGS. 5 and 6. FIG. 5 shows a projection view of an accelerometer whose housing has been broken apart to expose the accelerometer mass. FIG. 6 shows a cross-sectional view through central axes of an exciter system for one of the six accelerometer wires shown in FIG. 5.

In FIG. 5 the accelerometer is shown to comprise a mass 24 which is supported by three pairs of wires 25 and located by these wires at the centre of a cube-like housing. This housing comprises six side plates 27 which are shown to be broken apart in the drawing but are normally bolted together to form a closed container. The wires 25 extend through central apertures in the side plates 27 and pass through cylindrical containers 28 to clamping fixtures 29 at the remote ends of these containers. The containers 28 are fixed to the plates 27 so that when the six plates are bolted together the plates and the containers 28 together form a frame structure for the accelerometer system. The wires 25 are fixed to the mass 24 by clamping means 30 and the tension in the wires can be adjusted as well as the position of the mass 24 within the accelerometer housing by adjusting the clamping fixtures 29.

The arrangement of the clamping fixtures 29 is more clearly shown in FIG. 6. Here, it is shown that a wire 25 passes round a roller 29a. This roller can be turned by a spanner or screw driver to adjust the tension in the wire 25 and the roller can be locked at each end in an adjusted position by tightening a screw 31 which clamps the roller 29a between two bracket members 29b and 29c of the clamping fixture 29.

The wire 25 is shown in FIG. 6 to lie along the central axis A—A of the cylindrical container 28. This container 28 also houses a toroidal primary winding 22a whose function has already been described. The means for exciting the vibration of the wire 25 are shown at 32. These means comprise two exciter units which are electromagnetic devices adapted to apply a magnetic force of attraction to the wire 25. These exciter units 32 also function as the pick-off units 15 already mentioned with reference to FIGS. 1 and 2 since under resonant conditions the impedance of the exciter units is a minimum and this is a condition which the electrical circuit used to supply the units can detect and respond to. The wire 25 is, for this purpose, composed of a ferromagnetic material and is disposed closely adjacent the pole faces of an exciter magnet so as to form in effect a yoke member in the flux circulation path of the magnetic circuit. By applying suitable electrical control to energise the magnets of the exciter means at 32, the wire 25 can be caused to vibrate at a natural frequency.

With the arrangement shown in FIGS. 5 and 6 much of the heat transfer between a wire 25 and its surrounds take place between the wire and the container 28 housing the wire. Thermal interaction effects between the different wires are, therefore, mitigated owing to the large thermal capacity of the various parts of the accelerometer frame structure.

With the three-dimensional ligamentless form of accelerometer system difficulties are encountered when the design involves obtaining different natural frequencies as between the wires of each pair by making their lengths unequal. The difficulties arise from a cross-coupling effect due to the geometrical asymmetry of the suspension. This can be avoided by using wires of equal length but unequal mass per unit length, e.g. wires of different section or wires mass-loaded by electro-plating; relying on the different mass per unit length to produce the initial difference frequency required to obviate the pulling effects.

What I claim as my invention and desire to secure by Letters Patent is:

1. An accelerometer of the kind in which the natural frequencies of a plurality of pre-tensioned mass-loaded strings are applied to measure acceleration, comprising, in combination in an assembly, a frame structure, a suspended body providing a mass load, two strings which hold one another in tension by supporting the body between them from the frame structure and which have different physical characteristics which affect their, and so as to have, unequal natural fundamental frequencies of vibration over the whole operating range of the accelerometer including a zero-acceleration condition, exciter means positioned to act on the strings to sustain vibration in the strings at their natural fundamental frequencies, detector means positioned to respond to the vibration of the strings and operative to produce electrical signals alternating at the string vibration frequencies, and computer means responsive to these electrical signals and operative to compare the frequencies of these signals in respect of their dependence upon the mass loading of the strings to produce an output signal which alternates at a frequency which is a direct measure of acceleration.

2. An accelerometer of the kind in which the natural frequencies of a plurality of pre-tensioned mass-loaded strings are applied to measure acceleration, comprising, in combination in an assembly, a frame structure, a suspended body providing a mass load, two strings of equal length which hold one another in tension by supporting the body between them from the frame structure and which have a different mass per unit length so as to have unequal natural fundamental frequencies of vibration over the whole operating range of the accelerometer including a zero-acceleration condition, exciter means positioned to act on the strings to sustain vibration of the strings at corresponding frequencies, detector means positioned to respond to the vibration of the strings and operative to produce electrical signals alternating at the string vibration frequencies, and computer means responsive to these electrical signals and operative to compare the frequencies of these signals in respect of their dependence upon the mass loading of the strings to produce an output signal which alternates at a frequency which is a direct measure of acceleration.

3. An accelerometer of the kind in which the natural frequencies of a plurality of pre-tensioned mass-loaded strings are applied to measure acceleration, comprising, in combination in an assembly, a frame structure, a suspended body providing a mass load, two identical strings which hold one another in tension by supporting the body between them from the frame structure, exciter means positioned to act on the strings to sustain vibration of the strings at different frequencies so that they have unequal frequencies of vibration over the whole operating range of the accelerometer including a zero acceleration condition, detector means positioned to respond to the vibration of the strings and operative to produce electrical signals alternating at the string vibration frequencies, and computer means responsive to these electrical signals and operative to compare the frequencies of these signals in respect of their dependence upon the mass loading of the strings to produce an output signal which alternates at a frequency which is a direct measure of acceleration.

4. An accelerometer of the kind in which the natural frequencies of a plurality of pre-tensioned mass-loaded strings are applied to measure acceleration, comprising, in combination in an assembly, a frame structure, a suspended body providing a mass load, two strings having identical physical characteristics which affect their natural fundamental frequencies of vibration, said strings holding one another in tension by supporting the body between them from the frame structure, exciter means positioned to act on the strings to sustain vibration of the strings at different frequencies so that they have unequal frequencies of vibration over the whole operating range of the accelerometer including the zero-acceleration condition, detector means positioned to respond to the vibration of the strings and operative to produce electrical signals alternating at the string vibration frequencies, and computer means including frequency converter circuitry adapted to respond to each said signal to modify the frequency of each signal by a factor inversely proportional to the natural frequency of the corresponding string in the zero-acceleration condition to produce in effect alternating signals having frequencies equal to the vibration frequencies of the two strings, said computer means further including circuit means responsive to these two frequency converted signals and adapted to produce an output signal having a frequency equal to the frequency difference between these latter signals.

5. An accelerometer of the kind in which the natural frequencies of a plurality of pre-tensioned mass-loaded strings are applied to measure acceleration, comprising, in combination in an assembly, a frame structure, a suspended body providing a mass load, two strings which hold one another in tension by supporting the body between them from the frame structure, means for adjusting the length of at least one of the strings to provide a calibration control which affords a compensation for a parabolic term in the output-acceleration characteristic of the accelerometer, exciter means positioned to act on the strings to sustain vibration of the strings at different frequencies so that they have unequal frequencies of vibration over the whole operating range of the accelerometer including the zero acceleration condition, detector means positioned to respond to the vibration of the strings and operative to produce electrical signals alternating at the string vibration frequencies, and computer means responsive to these electrical signals and operative to compare the frequencies of these signals in respect of their dependence upon the mass loading of the strings to produce an output signal which alternates at a frequency which is a direct measure of acceleration.

6. An accelerometer of the kind in which the natural frequencies of a plurality of pre-tensioned mass-loaded strings are applied to measure acceleration, comprising, in combination in an assembly, a frame structure, a suspended body providing a mass load, two strings which hold one another in tension by supporting the body between them from the frame structure, means for adjusting the length of at least one of the strings to provide a calibration control which affords a compensation for a parabolic term in the output acceleration characteristic of the accelerometer, exciter means positioned to act on the strings to sustain vibration of the strings at different frequencies so that they have unequal frequencies of vibration over the whole operating range of the accelerometer including the zero acceleration condition, detector means positioned to respond to the vibration of the strings and operative to produce electrical signals alternating at the string vibration frequencies, and computer means including frequency converter circuitry adapted to respond to each said signal to modify the frequency of each signal by a factor inversely proportional to the natural frequency of the corresponding string in the zero-acceleration condition to produce, in effect, alternating signals having frequencies equal to the vibration frequencies of the two strings, said computer means further including circuit means responsive to these two frequency converted signals and adapted to produce an output signal having a frequency equal to the frequency difference between these latter signals.

7. An accelerometer of the kind in which the natural frequencies of a plurality of pre-tensioned mass-loaded strings are applied to measure acceleration, comprising, in combination in an assembly, a frame structure, a suspended body providing a mass load, three orthogonally-arranged pairs of strings which support a body between them from the frame structure, the strings of each pair holding one another in tension by supporting the body between them and all the strings being of equal length but having different masses per unit length whereby the strings have unequal natural fundamental frequencies of vibration over the whole operating range of the accelerometer including a zero-acceleration condition, exciter means positioned to act on the strings to sustain vibration of the strings at corresponding frequencies, detector means positioned to respond to the vibration of the strings and operative to produce electrical signals alternating at the string vibration frequencies, and computer means responsive to these electrical signals and operative to compare the frequencies of these signals in respect of their dependence upon the mass loading of the strings to produce an output signal which alternates at a frequency which is a direct measure of acceleration.

References Cited in the file of this patent

UNITED STATES PATENTS

| | | |
|---|---|---|
| 1,948,104 | Firestone | Feb. 20, 1934 |
| 1,995,305 | Hayes | Mar. 26, 1935 |
| 2,725,492 | Allan | Nov. 29, 1955 |

FOREIGN PATENTS

| | | |
|---|---|---|
| 729,894 | Germany | Dec. 19, 1942 |
| 585,140 | Great Britain | Jan. 30, 1947 |